Oct. 12, 1948.  G. S. VAN ANTWERP  2,451,004
SECTIONALIZED AERIAL DUCT
Filed June 23, 1945  2 Sheets-Sheet 1
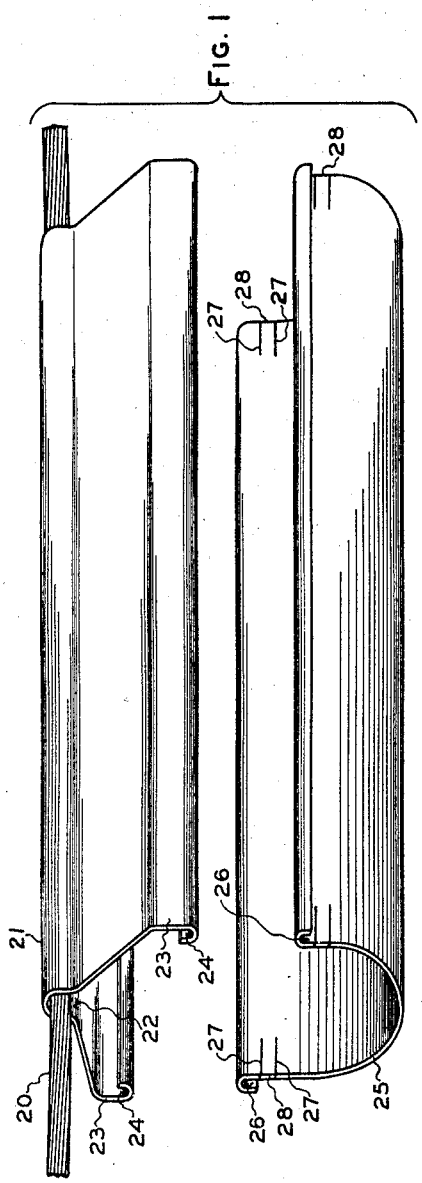
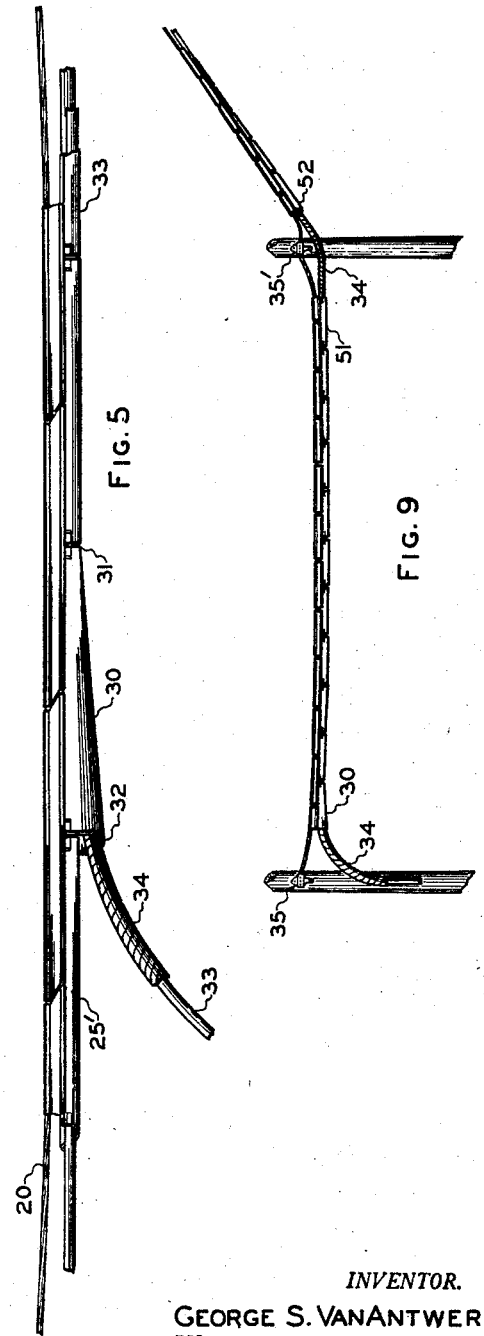
INVENTOR.
GEORGE S. VAN ANTWERP
BY
Augustus B. Stoughton
ATTORNEY

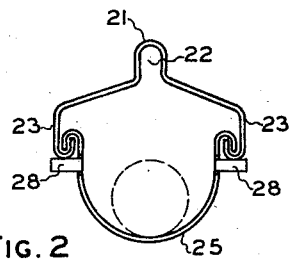
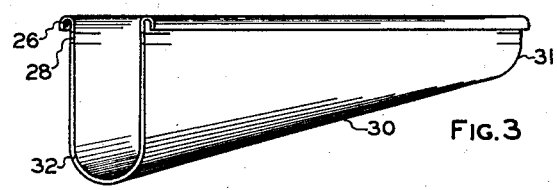
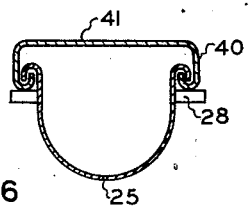
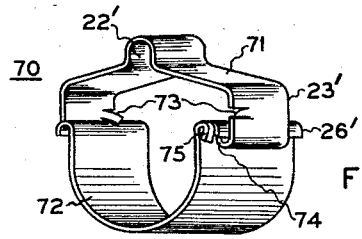
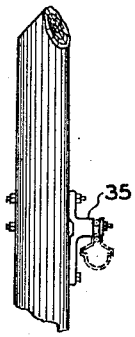
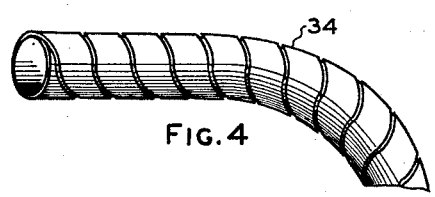
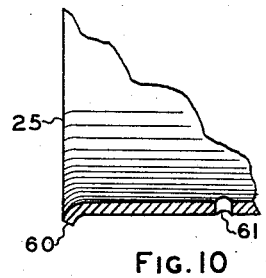
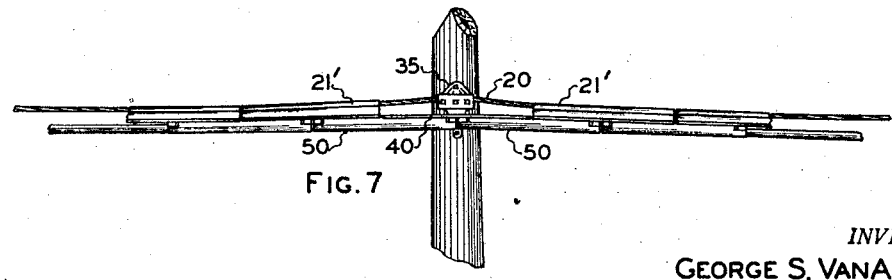
INVENTOR.
GEORGE S. VAN ANTWERP
BY
Augustus B. Stoughton
ATTORNEY Patented Oct. 12, 1948

2,451,004

UNITED STATES PATENT OFFICE 2,451,004

SECTIONALIZED AERIAL DUCT

George S. Van Antwerp, Norristown, Pa.

Application June 23, 1945, Serial No. 601,258

4 Claims. (Cl. 174—41)

In insulated electric power or communication cables whose mechanical characteristics are such that they are not self-supporting, when carried aerially, are usually suspended along the spans of messenger cables by suitably spaced rings linking them to the messengers. The suspended cables, which are usually heavy and sheathed with lead, have an extremely short life due to the abrading action of the rings and the vibration incident to such construction. Despite alloying of the lead sheath with antimony or other elements to improve endurance, and the use of various types of ring saddles to distribute stresses, the life of this type of cable is unsatisfactory. Also, cables exposed in such manner are extremely susceptible to damage from shot or small caliber rifle fire aimed at birds sitting on the messengers. They are also subject to abrasion by tree limbs and to damage from accidental fires in their immediate proximity. Furthermore, the weight is transmitted by the rings to points of local stress concentration on the messenger cable, causing undue wear and corrosion at such points.

The objects of my invention are: to provide a sectionalized aerial duct system in which cables, hoses, flexible tubes, or the like, are supported substantially continuously along their entire lengths; to produce a sectionalized aerial duct system providing a substantially complete enclosure shielded from direct solar radiation and flames from accidental fires; to provide a sectionalized aerial duct system providing an armored enclosure; to provide sectionalized aerial duct units adapted to be removably attached to an aerial messenger; to provide a messenger-supported, sectionalized aerial duct system for cables, or the like, in which the duct sections can be installed or removed with the cable in place, with utmost ease and simplicity; and to produce an integrated, sectionalized aerial duct system having associated accessory units for terminations, messenger supports, taps, bifurcations, etc.

With these and other objects in view which will appear from the ensuing description and claims, the following describes the details of construction and combination of parts of a specific embodiment of my invention, which I illustrate as an example, and which will best be understood when read in conjunction with the accompanying drawings, in which:

Fig. 1 is a perspective view showing the separate parts of a standard section of my aerial duct;

Fig. 2 is an end elevational view of an assembled standard duct section;

Figure 3 is a perspective view of a vertical-offset saddle member;

Fig. 4 is a fragmentary perspective view of a section of flexible conduit;

Fig. 5 is a fragmentary perspective view showing a messenger carrying a duct run including an offset section;

Fig. 6 is a transverse sectional view of a saddle member assembled to a flat cover member;

Fig. 7 is a side elevational view showing construction at support for a straight run of duct;

Fig. 8 is a side view of the mounting bracket shown in Fig. 7;

Fig. 9 is a perspective view illustrating method of construction at terminals and bends;

Fig. 10 is a fragmentary sectional view of a saddle member showing method of flaring ends and drainage apertures; and Fig. 11 is a perspective view of a modification of my invention for use in place of messenger rings.

Referring to the drawings, I have shown in Fig. 1 a messenger cable 20 on which is mounted a hanger cover member 21 formed or bent from sheet material in the shape of an inverted U-fold at the top constituting a longitudinal central groove 22, thence sloping downwardly on either side to vertical sides 23 and finally folded over inwardly and upwardly to form grooves or folds 24. A co-operating saddle member 25 of relatively thin material is fashioned in a U-shape with its edges folded over outwardly and downwardly to form grooves or folds 26 which clasp or interlock with the grooves 24 of the hanger 21, as shown in Fig. 2.

The members 21 and 25 thus form a continuous ductway of box-shaped cross section, of which the hanger member 21 defines the ceiling and the saddle member 25 defines the floor, for accommodating one or more cables.

The members 21 and 25 may be united by sliding in from the ends or by squeezing or compressing the sides of the saddle 25 together, raising the saddle within the hanger 21 until the grooves 26 are above the grooves 24, releasing the compression on the sides of the saddle, permitting it to spring back to its initial shape, and allowing the saddle to drop into the position illustrated in Fig. 2. Assembly of the members may also be accomplished by springing apart the sides 23 of the hanger instead of squeezing the saddle. The hanger 21 and saddle 25 are readily separated by the reverse of either of these procedures. Parallel longitudinal slits 27 are cut in the saddle 25 inwardly from the ends to form locking fingers 28 just below the grooves 26. When bent outwardly as shown in Fig. 2, with a screw driver or other simple tool, the fingers 28 lock the members 21 and 25 together to prevent separation either by lifting or sliding.

On installing my duct system, I prefer to stagger the relative positioning of the hanger and saddle members as shown in Figs. 5, 7 and 9, although they may be coextensive is desired. It is also to be understood that they may be of any suitable length, and a particular hanger need not be the same length as the associated saddle.

When it is desired to have additional cables enter the duct run at any point, to be supported along with cables already in place or to be spliced thereto, a vertical-offset saddle 30 is used. The offset 30 is identical with the saddle 25 except that it is tapered longitudinally, with the shallower end 31 matching the ends of the saddle 25. The offset 30 is of uniform width, the deeper end 32 being of depth suitable to admit the branch cable 33 below an adjacent saddle 25', as illustrated in Fig. 5, and to enclose the splice if the cables are joined. Protection for the branch cable 33 is provided by means of a section 34 of flexible conduit of the interlocking helix type well known in the art. The offset 30 is also used at terminations where the cable leaves the duct run in a downwardly direction, as shown in Fig. 9.

In the construction at the messenger support for a straight run of duct, the hangers 21' are installed with the messenger 20 exposed for a short distance either side of the messenger clamp 35, as shown in Fig. 7. The saddles 50 are contiguous beneath the clamp and are supported for part of their lengths by the hangers 21'. Over the portion of the saddles 50 not topped by the hangers 21', there is fitted a flat cover member 40. The flat cover 40, illustrated in Fig. 6, is similar to the hanger 21, differing only in that the groove 22 and sloping sides are replaced by a flat, horizontal portion 41. The saddle 25 and offset 30 are attached to the flat cover 40 in the same manner as to the hanger 21. As shown in Fig. 7, the flat cover 40 may be readily bent to conform to the small angle between the saddles 50.

At cable terminals, the cable is carried from the end duct to the desired destination within a length of the flexible conduit 34, as illustrated in Fig. 9, it being understood that the messenger itself may be continued beyond the end of the duct system to a suitable supporting structure. The construction at bends in the duct run is similar to the construction at terminals, the cable being carried from the end duct 51 of one span to the end duct 52 of the angularly disposed span within a length of the flexible conduit 34.

The edges of the ends of the saddles 25 and 32 are preferably flared outwardly, as illustrated by the flare 60 in Fig. 10, for the purpose of minimizing chafing of the cables or other units carried, in the event they are to be pulled through the ducts. The flare 60 also provides a drip edge to prevent accumulation of rain water. In case additional relief of rain water is needed, the saddles may be perforated at the botom, as shown by the aperture 61, spaced as desired.

With slight modification of the locking means described in the foregoing, and when cut down to suitable lengths, my hanger and saddle duct members may be used as rings which will minimize scoring and chafing of the messengers caused by the rings in present use. In Fig. 11, I show a ring assembly 70 comprising a hanger member 71 which is a fore-shortened replica of the hanger 21, attached centrally to a co-operating saddle member 72 which is identical to the saddle 25 in cross-section and somewhat longer in length than the hanger 71. At each end, the hanger 71 is provided with a locking finger 73, formed by cutting parallel, longitudinal slits in the sides 23', the two fingers being diagonally opposite. The fingers 73 are bent inwardly over the folds 26' to prevent vertical separation of the members. To prevent longitudinal sliding separation of the members 71 and 72, a vertical cut 74 is made in the outer part of the fold 26' near each end of the saddle 72 on the same side as the adjacent finger 73. Outwardly of the cut 74, the outer, downwardly projecting part 75 of the fold 26' is pinched inwardly to form a lock. The diagonally opposite pairs of fingers 73 and pinched parts 75 of the ring assembly 70 effectively prevent separation of the members 71 and 72. When it is desired to separate these members, however, the fingers 73 are readily straightened with ordinary pliers, permitting the saddle to be removed by lifting, squeezing and lowering it out of engagement with the hanger 71. The end edges of the groove 22' and the saddle 72 may be flared, similar to the flare 60, or rounded to minimize chafing of the messenger and the cables being supported. The groove 22' is pinched or otherwise suitably narrowed to engage the messenger tightly enough to prevent slipping under ordinary service conditions.

From the foregoing, it is evident that the cable may be drawn into ducts already in place or that my duct sections may be installed about a cable disposed aerially in proper relation to the messenger including existing messenger-supported cable. In the latter case, the hanger is fitted over the messenger and the saddle slid or snapped into place, any interfering rings or other supporting structures being removed as installation proceeds. Removal of individual duct sections for replacement of duct members or for work on the cables carried therein is readily accomplished by the previously described procedure for releasing the saddle member from the hanger member.

Although I have described and shown my duct system as used to carry cables, it is obvious that it may be used with equal effectiveness for supporting aerial runs of hose or other flexible tubing for the transport of fluids or pulverized materials.

Also, it is to be understood that the duct members can be made of any materials having the desired mechanical properties, such as metals or plastics, nor is it necessary that the interlocking parts be of the same material. For example, the hangers may be of resilient material and the saddles of non-resilient material, in which case the members may be engaged by sliding them together or by springing open the hangers as previously described. Again, both members may be formed of a rigid material, such as glass or fiber, and installed by sliding them into engagement. Ducts of glass or other good dielectric may be of advantage in certain locations to give electric cables additional impulse strength.

When it is desired to armor the supported lines, the ducts may be made from suitable thickness of high strength material. If support of weight only is required, they may be constructed from very thin or light materials, or from woven or perforated materials such as expanded metal, since the weight distribution is uniform on the duct members as well as the messenger.

Enclosure of electric power services in my ducts has the added advantage of providing substantial anti-tampering protection.

I claim:

1. A messenger-supported aerial duct system composed of a plurality of contiguous sections of duct, each section comprising a hanger member and a saddle member, the hanger member having a groove for receiving the messenger and having downwardly and outwardly diverging portions, and the saddle member having upwardly and outwardly diverging portions interlocked with the downwardly diverging portions of the hanger member and forming therewith a continuous ductway for one or more cables, of which the hanger member defines the ceiling and the saddle member defines the floor.

2. A messenger-supported aerial duct system composed of a plurality of contiguous sections of duct, each section comprising a hanger member and a saddle member, the hanger member having a groove for receiving the messenger and having downwardly and outwardly diverging portions, and the saddle member having upwardly and outwardly diverging portions interlocked with the downwardly diverging portions of the hanger member and forming therewith a continuous ductway for a plurality of cables, of which the hanger member defines the ceiling and the saddle member defines the floor, one of said duct sections having a saddle member longitudinally tapered and having a shallow end conforming to the normal cross section of the ductway and a deep end extending beneath the bottom of an adjacent saddle member, a cable extending through all of the sections of said ductway, and a second cable entering the ductway through said tapered saddle member.

3. In combination with an aerial messenger, a support for a cable to be suspended therefrom comprising a hanger member depending from said messenger, and a saddle member depending from the hanger member, said hanger member and saddle member being provided with folded edges whereby they are slidably interlocked, one of said members being slitted to provide a finger at its folded edge, and said finger being bent to engage the other of said members and thereby prevent vertical separation between said members.

4. In combination with an aerially supported messenger, a duct system comprising a plurality of contiguous duct sections each comprising a hanger member and a saddle member, said members being separably attached to form a unitary structure defining a ductway generally paralleling said mesenger, the hanger members depending from the messenger and the saddle members depending from the hanger members, the hanger members being positioned in staggered relation to said saddle members, a support for the messenger intermediate of said duct system, the hanger members to either side of said support being spaced therefrom and the saddle members being continuously abutted past said support, and a cover member equal in length to the spacing between the hanger members to either side of said support, said cover member engaging the saddle members in the space between the hanger members at said support.

GEORGE S. VAN ANTWERP.

REFERENCES CITED

The following references are of record in the file of this patent:

UNITED STATES PATENTS

| Number | Name | Date |
|---|---|---|
| 324,225 | Carhart | Aug. 11, 1885 |
| 526,663 | Abrahams | Sept. 25, 1894 |
| 989,212 | Van Nostran | Apr. 11, 1911 |
| 1,967,134 | Short | July 17, 1934 |